Feb. 3, 1925.
T. DE L. GRAHAM
AUTOMOBILE HEADLIGHT REFLECTOR
Filed Dec. 7, 1922
1,525,234
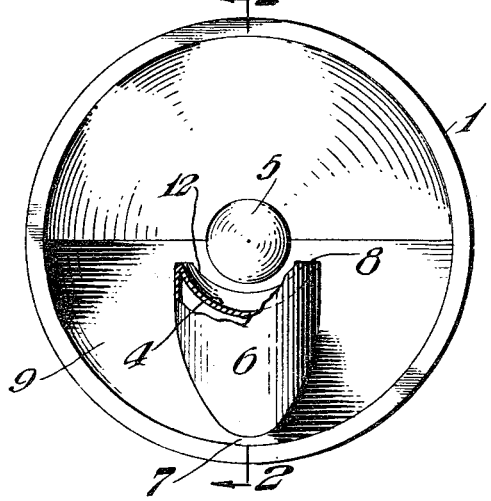
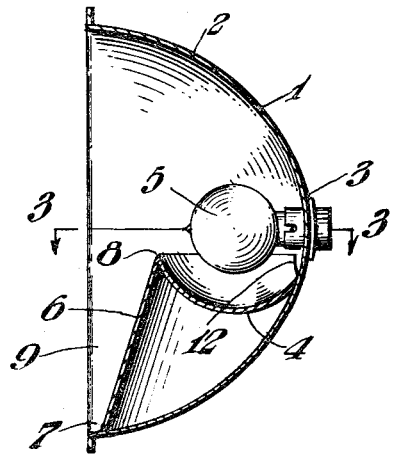
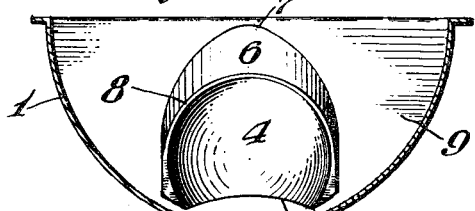
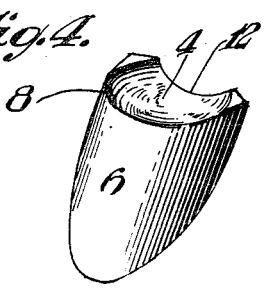
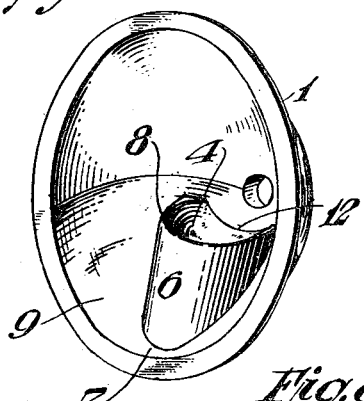
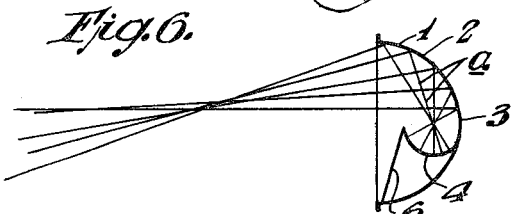
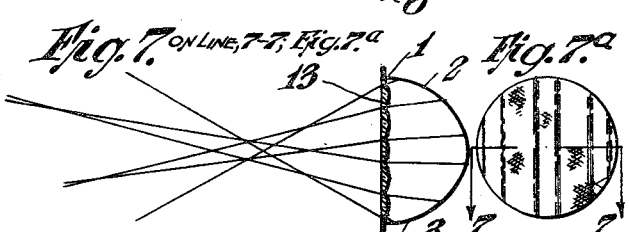
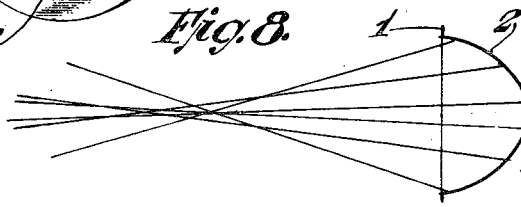
INVENTOR:
Thomas de L. Graham.
BY
ATTORNEYS.

Patented Feb. 3, 1925.

1,525,234

UNITED STATES PATENT OFFICE.

THOMAS DE LEON GRAHAM, OF PHILADELPHIA, PENNSYLVANIA, ASSIGNOR OF ONE-THIRD TO F. MORTIMER CLEVELAND, OF PHILADELPHIA, PENNSYLVANIA.

AUTOMOBILE HEADLIGHT REFLECTOR.

Application filed December 7, 1922. Serial No. 605,339.

*To all whom it may concern:*

Be it known that I, THOMAS DE LEON GRAHAM, a citizen of the United States, residing in the city and county of Philadelphia, State of Pennsylvania, have invented a new and useful Automobile Headlight Reflector, of which the following is a specification.

My invention consists of a novel construction of headlight reflector, particularly adapted for automobiles and other self propelled vehicles, and the invention is directed to improvements in the device shown and described in my prior application, Serial No. 584,199, filed August 25, 1922, said application having issued under date of July 17th, 1923, as Patent No. 1,462,036, wherein I locate within a primary or parabolic reflector a secondary or concave reflector directly under and in proximity to the source of light, below which I locate a convex deflector, whose horizontal median line extends at substantially a right angle to the horizontal axis of the source of light and whose outer convex surface inclines from a point within the primary or parabolic deflector downwardly and outwardly to a point coincident with the lower portion of said parabolic reflector, whereby the lower central portion of the main parabolic deflector is rendered incapable of projecting light rays in planes above the top of the device which blind the driver of an approaching vehicle.

By my invention a novel device is produced, whereby the driver of a motor vehicle is enabled distinctly to see the road ahead for its full width, and for an extent of several hundred feet ahead, and the light rays are deflected both downwardly upon the road in advance of the vehicle, and directly ahead in planes which shall not rise above the ground to dazzle the eyes of approaching pedestrians or drivers of approaching vehicles, the construction and mode of operation which will project the rays of light emanating from a source within it, in substantially parallel planes horizontal from the reflecting surfaces, below the top of the headlight, being such that all the light beams or rays are properly utilized, and substantially no light strikes said reflecting surfaces at such angles as to be reflected improperly upwardly.

A still further object of the invention is to provide a novel structure and method of constructing the headlight reflector including the main or primary parabolic reflector, and the secondary concave or semispherical reflector whose convex lower portion or extension thereof also forms a reflector, whereby to facilitate the manufacture and permit more economical production.

It further consists of other novel features of advantage and construction as will be hereinafter set forth.

For the purpose of illustrating my invention, I have shown in the accompanying drawings, forms thereof which are at present preferred by me, since the same will give in practice satisfactory and reliable results, although it is to be understood that the various instrumentalities of which my invention consists may be variously arranged and organized and that my invention is not limited to the precise arrangement and organization of these instrumentalities as herein shown and described.

Figure 1 represents a front elevation of a novel construction of reflector, embodying my invention.

Figure 2 represents a vertical section of Figure 1, taken on line 2—2 of Figure 1.

Figure 3 represents a horizontal section of the reflector, the section being taken on the line 3—3 of Figure 2.

Figure 4 represents a detached perspective view of the element forming the secondary and convex reflectors.

Figure 5 represents on a reduced scale a perspective view of Figure 1.

Figure 6 represents on a reduced scale, a vertical sectional view corresponding to the section seen in Figure 2, but showing the general direction taken by the rays of light.

Figure 7 represents a horizontal section taken on line 7—7 of Figure 7ª with a special lens employed.

Figure 7ª represents a rear view of the lens seen in Figure 7.

Figure 8 represents a view similar to Figure 7, without a lens.

Similar numerals of reference indicate corresponding parts in the figures.

Referring to the drawings:—

In carrying out my invention, I employ in conjunction with a source of light three essential elements which are collocated in a novel manner, so as to utilize and deflect the rays of light in planes below the top of the reflector, my invention comprising the primary parabolic reflector 1 having its curvatures 2 and 3 struck from the centers of different radii, its curvature at the point 3 being struck from the longer radius. Below the horizontal median line of the parabolic reflector 1, I locate the secondary concave or semispherical reflector 4, whose curvature is coincident with the center of the source of light 5 fitted in a central hole at the back of the reflector 1, and said concave reflecting surface 4 merges at its front and sides into the upper portions of the convex reflector 6 located below it, said reflector 6 having also convex side walls extending from the upper front and side portions of the reflector 4 down to near the bottom of the main reflector 1.

The main or parabolic reflector 1 as to its major area, has a reflecting surface of the contour of a paraboloid of revolution, but any other paraboloidal or other equivalent surface which is adapted to the purpose may be employed.

The convex reflector 6 is so positioned that its upper edge 8 where it merges into the secondary hemispherical concave reflector 4, extends in a horizontal plane, which is positioned at or below the horizontal median line of the main parabolic reflector 1, and the vertical longitudinal median line of the convex reflector 6 is at a right angle to the horizontal median line of said reflector 1.

It will be further apparent that the front upper curved edge of the convex reflector 6, where it joins or merges into the secondary concave reflector 4 is positioned within the primary parabolic reflector 1 and at a point in advance of the source of light 5, and the front convex surface of said reflector 6 inclines, from its top downwardly and outwardly toward the lower portion of said primary parabolic reflector to which it conforms, as indicated at 7, and the lower half portion of the primary reflector 1 is rendered non-functional or non-reflective, as indicated at 9, as by treating the metal surface or coating the same with a non-reflecting pigment or shell, thus rendering it inoperative for reflecting purposes, such as would cause a glare or upward reflection of light rays.

It consequently follows from the foregoing construction that I have produced a novel device, wherein the lower portion of the main primary parabolic reflector 1 is rendered non-functional by reason of the position of the convex reflector 6 and non-reflective portion 9, and consequently the lower portion of the main reflector 1, cannot reflect light beams or rays upwardly in planes above the top of the device as would be the case if the convex reflector 6 and non-reflective portion 9 were omitted.

It will therefore be apparent that light rays impinging upon the convex surface 6, will be deflected against the lower side reflecting surfaces of the main parabolic reflector 1, and since in accordance with well-known laws of physics, any rays from a focus are reflected from the surface of a parabolic mirror in lines parallel with the axis thereof, it will be apparent that the light rays reflected from the concave surface 4 against the upper central and side portions of said main reflector will be greatly intensified when they leave the same.

This will be apparent from Figure 6, from which it will be seen that any direct divergent rays, which are the cause of the objectionable "road glare," will in my novel construction be so intercepted, that they will pass out from the headlight both downwardly so as to illuminate the roadway close to the car and in planes below the top thereof.

I have shown diagrammatically in Figure 6, the course certain of the rays take in my device in accordance with well known optical and physical laws, the angle of incidence, and the angle of reflection being equal, and the rays striking the mirror 4 being reflected directly back across the focal point to the parabolic surface, from which they will be projected forwardly. The reflector composed of the primary parabolic surfaces 2 and 3, the secondary concave and convex surfaces 4 and 6 may be pressed, stamped, spun or otherwise formed out of sheet metal by a plurality of operations or by a single operation and may be made in sections and thereafter united or assembled by spot welding, brazing or other means well known in the art.

In the preferred embodiment illustrated, the secondary concave or substantially semispherical and convex surfaces 4 and 6 are formed as a single piece or element and are retained in position in any suitable manner, and the lower portion of the reflector is continued down to form a continuous unbroken wall or surface which is symmetrical and more attractive in appearance, and the parts more readily manufactured and assembled.

It is not necessary in my device to use any dimmer and no special lens are required, since any ordinary plate glass lens will suffice.

A wider spread of concentrated light rays may be effected by employing in conjunction with the foregoing essential elements, a lens 13 seen in Figure 7, designed to diverge the rays in horizontal planes only.

In Figure 8, the lens 13 shown in Figure 7, is omitted and the projection of light rays lengthened before intersecting or crossing.

It will further be seen that in addition to the three elements comprising the main or primary parabolic reflector 1, the concave reflector 4 and the convex reflector 6, collocated as above described, I employ the additional novel feature of making the lower portion of the reflecting surface of the parabolic reflector non-reflective as indicated at 9 (see Figure 1).

It will also be seen that the concave or hemispherical reflector 4 is somewhat less than a true hemispherical surface, since the reflecting area is formed by having the upper portion which would constitute a true hemisphere removed on a horizontal plane, conforming to the horizontal line 8, and in addition the rear of said reflecting surface is removed as indicated by the line 12.

It is not necessary in this invention to use dimmers, but a small parking light may be positioned at the top of the main reflecting surface or in the front of the convex or other surface surrounding the secondary reflector.

It will be apparent from the foregoing that in my novel invention, I employ a main reflecting surface occupied by the upper half of the reflector and having the contour of a paraboloid of revolution, it being apparent that the surface of the primary parabola above the horizontal meridian line is only and exclusively used as the main projecting surface and that I utilize all light rays from the source of light by employing a secondary concave reflector below the horizontal median line and which surface is in focus with the source of light, thereby reflecting all rays directly across the focal center to the main reflecting surface.

It will now be apparent that I have devised a novel and useful automobile headlight reflector which embodies the features of advantage enumerated as desirable in the statement of the invention and the above description, and while I have, in the present instance, shown and described a preferred embodiment thereof which will give in practice satisfactory and reliable results, it is to be understood that such embodiment is susceptible of modification in various particulars without departing from the spirit or scope of the invention or sacrificing any of its advantages.

Having thus described by invention, what I claim as new and desire to secure by Letters Patent, is:—

In a device of the character stated, the combination of a primary vertically disposed parabolic reflector having a continuous unbroken and symmetrical wall, a secondary hemispherical reflector, the lower part of which is non-reflective and horizontally disposed, and a lower convex reflector of substantial shield-like form secured at each side thereof to the wall of the primary reflector, said two latter reflectors being formed integrally and located below the horizontal median line of said primary reflector, the front surface of said convex reflector inclining downwardly and outwardly from a point within said primary reflector, and the longitudinal vertical median line of said convex reflector being at a right angle to the horizontal median line of said primary reflector.

THOMAS DE LEON GRAHAM.

Witnesses:
C. D. McVAY,
E. LEAH FARLEY.